US 9,025,549 B2

(12) United States Patent
Morinaga et al.

(10) Patent No.: US 9,025,549 B2
(45) Date of Patent: May 5, 2015

(54) ACCESS POINT AND INTERFERENCE CONTROL METHOD

(71) Applicant: Hitachi, Ltd., Tokyo (JP)

(72) Inventors: Yasutaka Morinaga, Kawasaki (JP); Shigenori Hayase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 13/656,279

(22) Filed: Oct. 19, 2012

(65) Prior Publication Data

US 2013/0286955 A1    Oct. 31, 2013

(30) Foreign Application Priority Data

Oct. 21, 2011   (JP) .................................. 2011-231257

(51) Int. Cl.
*H04W 72/12*     (2009.01)
*H04L 5/00*      (2006.01)
*H04W 88/08*     (2009.01)
*H04L 1/00*      (2006.01)

(52) U.S. Cl.
CPC .............. *H04W 72/1226* (2013.01); *H04L 5/00* (2013.01); *H04W 72/1289* (2013.01); *H04W 88/08* (2013.01); *H04L 1/0026* (2013.01)

(58) Field of Classification Search
CPC .................... H04W 72/1226; H04W 72/0406; H04W 72/085; H04W 72/082; H04W 72/1231
USPC .................... 370/329, 252; 375/267
See application file for complete search history.

(56) References Cited

U.S. PATENT DOCUMENTS

| | | | | |
|---|---|---|---|---|
| 6,937,843 | B2 * | 8/2005 | Foschini et al. | 455/1 |
| 7,047,016 | B2 * | 5/2006 | Walton et al. | 455/452.1 |
| 7,209,765 | B1 * | 4/2007 | Hayase et al. | 455/550.1 |
| 8,290,503 | B2 * | 10/2012 | Sadek et al. | 455/452.1 |
| 8,498,639 | B2 * | 7/2013 | Chen et al. | 455/434 |

(Continued)

FOREIGN PATENT DOCUMENTS

| | | |
|---|---|---|
| JP | 2006-238423 A | 9/2006 |
| JP | 2008-211349 | 9/2008 |

(Continued)

OTHER PUBLICATIONS

Ohgane, Takeo, et al.; A Study on a Channel Allocation Scheme with an Adaptive Array in SDMA; IEEE 0-7803-3659; Mar. 1997; pp. 725-729.

(Continued)

*Primary Examiner* — Rasheed Gidado
(74) *Attorney, Agent, or Firm* — Foley & Lardner LLP

(57) ABSTRACT

In MU-MIMO communication in which an AP (access points: wireless base station) receives signals sent from plural terminals at the same time and at the same frequency, combinations of terminal users and decoding order of the received signals are determined so that interference reduction advantage by applying SIC can be effectively obtained. The access point includes: a plurality of antennas; and a scheduler used for performing the MU-MIMO communication with a plurality of terminals at the same time and at the same frequency. The scheduler is configured to determine the combinations of the terminal users on the basis of uplink communication quality information of the plurality of the terminals when the MU-MIMO communication is performed, and to send the determined combinations of the users as schedule information.

6 Claims, 10 Drawing Sheets

(56) References Cited

U.S. PATENT DOCUMENTS

| | | | |
|---|---|---|---|
| 8,638,771 B2* | 1/2014 | Fernandez-Corbaton et al. | 370/345 |
| 8,644,263 B2* | 2/2014 | Cheng et al. | 370/335 |
| 8,655,396 B2* | 2/2014 | Malladi et al. | 455/522 |
| 2008/0151831 A1* | 6/2008 | Khan et al. | 370/330 |
| 2008/0232502 A1 | 9/2008 | Wild et al. | |
| 2009/0010369 A1 | 1/2009 | Yoshida et al. | |
| 2009/0016263 A1 | 1/2009 | Kishigami et al. | |
| 2009/0196364 A1* | 8/2009 | Nakajima et al. | 375/260 |
| 2010/0296591 A1* | 11/2010 | Xu et al. | 375/259 |
| 2011/0075752 A1* | 3/2011 | Zheng et al. | 375/267 |
| 2011/0200131 A1* | 8/2011 | Gao et al. | 375/267 |
| 2012/0063336 A1* | 3/2012 | Shany et al. | 370/252 |

FOREIGN PATENT DOCUMENTS

| | | | |
|---|---|---|---|
| JP | 2009-017011 A | 1/2009 |
| JP | 2010-520691 A | 6/2010 |

OTHER PUBLICATIONS

Foschini, Gerard J.; Layered Space-Time Architecture for Wireless Communication in a Fading Environment When Using Multi-Element Antennas; Bell Labs Technical Journal, Autumn 1996; pp. 41-59; Lucent Technologies, Inc.

Bourdoux, Andre, et al.; Joint TX-RX Optimisation for MIMO-SDMA Based on a Null-space Constraint; 0-7803-7467; Mar. 2002; pp. 171-174.

* cited by examiner

FIG. 7

MU-MIMO TARGET MANAGEMENT BLOCK 206-4

| MS ID (206-4-1) | MU-MIMO TARGET JUDGMENT (206-4-2) | UPLINK SINR (206-4-3) |
|---|---|---|
| 00FFFF | TARGET | XX |
| 00FF00 | NON-TARGET | YY |
| ⋮ | ⋮ | ⋮ |
| 0000F0 | TARGET | ZZ |

# ACCESS POINT AND INTERFERENCE CONTROL METHOD

CROSS-REFERENCE TO RELATED PATENT APPLICATIONS

Japan Priority Application 2011-231257, filed Oct. 21, 2011 including the specification, drawings, claims and abstract, is incorporated herein by reference in its entirety.

BACKGROUND

The present invention relates to wireless communication apparatuses and wireless communication methods, and more particularly, to an AP (access point: wireless base station) and an interference control method that are suitable for uplink communications from MS's (mobile stations) to the AP in the case where the communications are performed between plural MS's and the AP at the same frequency and at the same time with the use of space division multiple access.

In recent years, as the field of communication antennas has been developing, a MIMO (multi-input multi-output) communication method that performs communication using plural antennas has become widely used. In the MIMO system, communication capacity can be increased by maximizing the number of channels between transmitters and receivers with the use of the maximum number of antennas. In addition, if technologies used in the MIMO communication method are seen from another point of view, this method can be said to include the following two technologies.
(1) SDMA (space division multiple access) technology that makes it possible for an AP to communicate with different MS's.
(2) SDM (space division multiplexing) technology that makes it possible for an AP to communicate with the same MS.

The SDMA technology is a technology in which different weighted coefficients (weights) are used for plural antennas respectively so that the magnitudes and phases of signals transmitted and received through the antennas can be adjusted, and different data series can be transmitted to plural MS's at the same frequency and at the same time by using spatial orthogonality in a propagation path. On the other hand, the SDM technology is a technology in which different weighted coefficients (weights) are used for plural antennas respectively so that the magnitudes and phases of signals transmitted and received through the antennas can be adjusted, and different data series can be transmitted to the same MS at the same frequency and at the same time by using spatial orthogonality in a propagation path.

In addition, there is a MIMO-SDMA technology created by combining these SDMA and SDM technologies. This technology is a technology in which the SDMA (space division multiple access) is used for data transmission to different MS's, and the SDM (space division multiplexing) is used for data transmission to the same MS, and this technology is also referred to as MU-MIMO (multi-user MIMO). The MU-MIMO technology is disclosed, for example, in Japanese Unexamined Patent Application Publication No. 2008-211349. In addition, the SDMA technology is disclosed, for example, in T. Ohgane, "A Study on a Channel Allocation Scheme with an Adaptive Array in SDMA," IEEE 47th VTC, Vol. 2, 1997, pp. 725-729. The SDM technology is disclosed, for example, in G. J. Foschini, "Layered Space-Time Architecture for Wireless Communication in Fading Environment When Using Multi-Element Antennas," Bell Labs Tech. J, autumn 1996, pp. 41-59. In addition, the MIMO-SDMA technology is disclosed in Andre Bourdoux, Nadia Khaled, "Joint TX-RX Optimization for MIMO-SDMA Based on a Null-space Constraint," IEEE 2002, pp. 171-174. In addition, a technology in which wireless resources are distributed to SDMA groups on the basis of propagation qualities and required communication qualities.

SUMMARY

In a wireless communication system using the MU-MIMO technology, because an AP receives plural different signals sent from plural MS's, the signal resolution of the receiver of the AP becomes important. If the receiver cannot distinguish independent signals from each other, the communication quality deteriorates owing to interferences among the signals. In such a case, a method is proposed in which optimal communication partners can be determined by taking combinations of relevant terminal users into consideration in order to improve the signal resolution of the receiver. However, the fact that a the tremendous amount of calculation processing is needed in order to determine optimal communication partners is disclosed, for example, in Japanese Unexamined Patent Application Publication No. 2008-211349.

As one of measures to decrease the above interferences, an interference reduction technology referred to as successive interference cancellation (SIC) is devised. The SIC is a technology in which a signal mixedly received with another signal is decoded, the replica signal of the decoded signal is created, and the replica signal is eliminated from all the received signals, which leads to the improvement of error characteristics of signals decoded later. In the above-mentioned Japanese Unexamined Patent Application Publication No. 2008-211349, a method using combinations of relevant users in which the SIC is applied to the MU-MIMO technology is not described.

An object of the present invention is to prevent the communication quality of the MU-MIMO from deteriorating by scheduling communications with the users by applying the interference reduction technology of the SIC to the MU-MIMO technology.

In order to address the above problem, configurations of an AP, which are described, for example, in the appended claims, will be adopted. This specification includes plural means for addressing the above problem. As one example of the means is an AP that includes: plural antennas; and a scheduler used for performing the MU-MIMO communication with plural terminals at the same time and at the same frequency. In addition, the scheduler is configured to determine combinations of the terminal users on the basis of uplink communication quality information of the plural terminals when the MU-MIMO communication is performed, and to send the determined combinations of the users as schedule information.

According to an aspect of the present invention, in the case where the SIC is applied to the MU-MIMO, the amount of processing necessary to determine pairs of users can be reduced, and interference can be also reduced by the effect of the SIC, and thereby a wireless communication apparatus with improved system throughput can be provided.

BRIEF DESCRIPTION OF THE DRAWINGS

FIG. 7 is a diagram showing an example of a table used in the case where the AP to which the present invention is applied manages the uplink SINRs of MU-MIMO target MS's and the uplink SINRs of MU-MIMO nontarget MS's;

DETAILED DESCRIPTION

The present invention is characterized in that, in an MU-MIMO system in which an AP (access point) having plural antennas and plural MS's (mobile stations) that communicate with the AP at the same time and at the same frequency, the AP manages communication qualities of uplink signals (uplink SINRs (signal to interference noise ratios)) sent from the MS's under the control of the AP itself. In addition the present invention is characterized in that, in the case where the AP determines combinations of multiplexed users by scheduling the AP performs on the MS's, the AP selects the combinations of the users by utilizing information about the communication qualities of the uplink signals or the like so that interference reduction advantage by applying the SIC can be effectively obtained. Hereinafter, the embodiments of the present invention will be described with reference to the accompanying drawings.

First Embodiment

Figure 1:
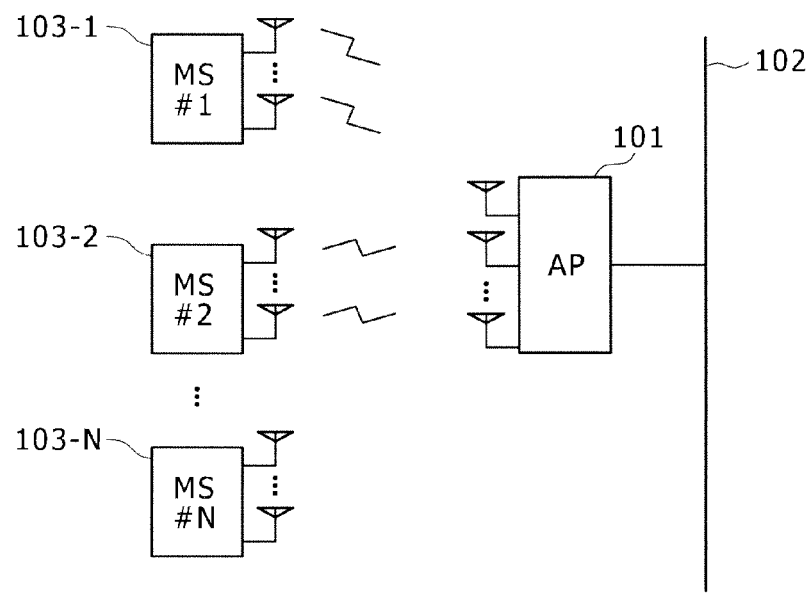
FIG. 1 is a diagram showing an example of a mobile wireless communication system to which the present invention is applied.

FIG. 1 is a diagram showing an example of a mobile wireless communication system to which a first embodiment of the present invention is applied, and FIG. 1 further shows an AP 101 having plural antennas, a network 102 that connects the AP to other APs with fixed-lines, and MS's 103 having communication with the AP.

Figure 2:
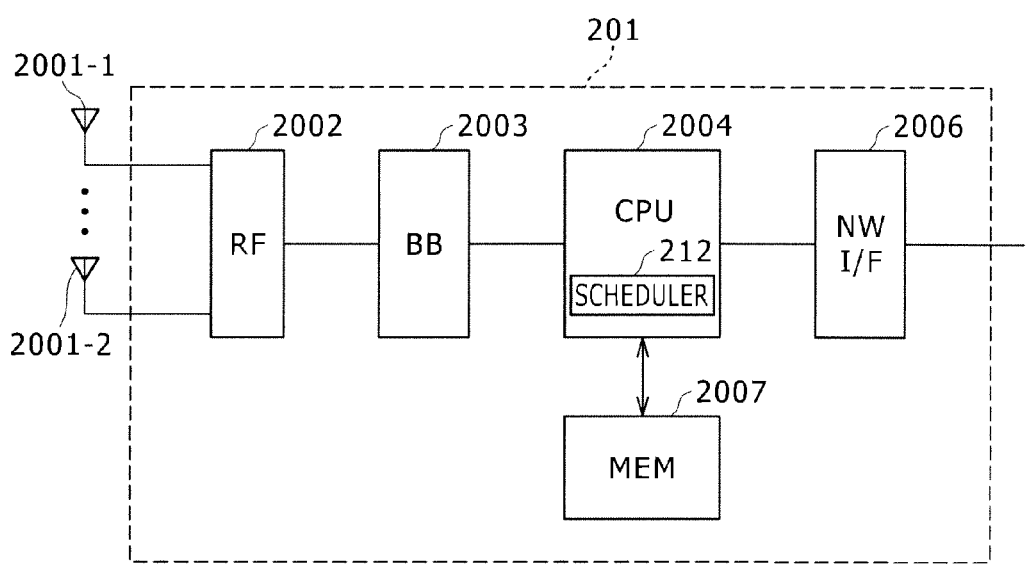
FIG. 2 is a block diagram showing an AP (access point) to which the present invention is applied.

FIG. 2 is a block diagram showing an AP 201 to which the first embodiment of the present invention is applied. The AP includes antennas 2001; an RF (radio frequency) unit 2002; a baseband signal processing unit 2003, a CPU (central processing unit) unit 2004; an NW I/F (network interface) unit 2006; and a memory 2007. The CPU unit 2004 includes a scheduler 212. The NW I/F unit 2006 provides an interface with the network, via which the AP and the other APs send and receive time-table setting information about embodiments to and from each other. The CPU unit 2004 performs control on the entirety of the AP. The scheduler 212 is embedded in the CPU unit 2004, and determines transmission timings; transmission beams; a modulation encoding method; transmission power; and frequency resource allocation. The memory 2007 stores the time-table setting information about the embodiments, control information necessary for transmission and reception, and downlink signals sent from the network. The baseband signal processing unit 2003 performs baseband signal processing. The RF unit 2002 performs conversion processing between analog transmission/reception signals and baseband signals. The above-described processing for controlling the AP in the time period of this embodiment is installed in the scheduler 212 and performed.

Figure 3:
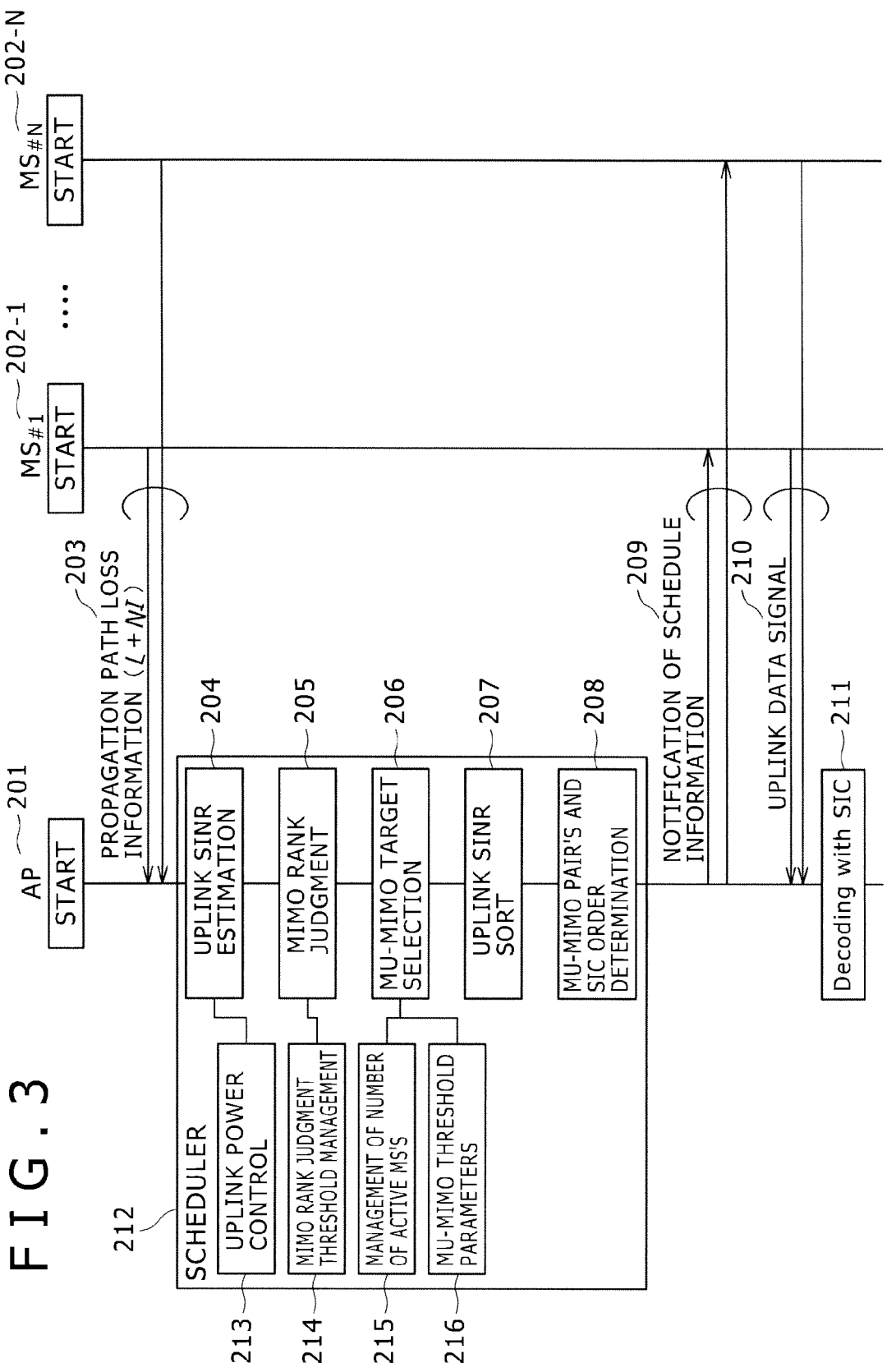
FIG. 3 is a diagram showing examples of the behavior of the AP and MS's (mobile stations) to which the present invention is applied.

FIG. 3 is a diagram showing the scheduler 212 of the AP 201, the processing contents of the scheduler, and behaviors of the MS's 202-1 to 202-N under the control of the AP at the time when the MS's are engaged in communication with the AP according to the first embodiment of the present invention. The reference numeral 203 denotes propagation loss information about losses generated between the MS's and the AP when signals are transmitted from the MS's to the AP. The reference numeral 212 denotes Scheduler block that resides in the AP and schedules the communication processing of the MS's. The reference numeral 204 denotes a block that resides in the scheduler 212 and estimates the uplink SINRs on the basis of propagation losses sent from the MS's. The reference numeral 205 denotes a block that resides in the scheduler 212 and judges the MIMO Ranks of the MS's determined from the SINRs measured and estimated at the block 204. The MIMO Ranks are used for judging MIMO target MS's and the judgment is performed on each MS. A block denoted by the reference numeral 206 is a block that resides in the scheduler 212, and judges the MIMO target MS's on the basis of the MIMO Ranks judged at the block 205. A block denoted by the reference numeral 207 is a block that resides in the scheduler 212, and sorts the uplink SINRs estimated at the block 204 among the SINRs of the MIMO target MS's judged at the block 206 in the order of higher SINRs. A block denoted by the reference numeral 208 is a block that resides in the scheduler 212, and determines combinations of MU-MIMO users on the basis of the uplink SINRs sorted at the block 207. The reference numeral 209 denotes downlink signals that notify schedule information decided by the AP to the MS's. The reference numeral 210 denotes uplink data signals sent from the MS's in accordance with the schedule notified by the downlink signals 209 to each MS. The reference numeral 211 denotes a block that decodes the MIMO signal sent from each MS with the use of the SIC, which is an interference technology, in accordance with the schedule determined by the block 208. The reference numeral 213 denotes Uplink Power Control block that resides in the scheduler 212, and controls uplink powers of the MS's. Uplink Power Control block 213 determines an offset value for each MS uplink power control in accordance with the success or failure of decoding the signal sent by each MS so that the error ratios of the signals sent by the MS's converge to a constant value. The reference numeral 214 denotes a block that resides in the scheduler 212, and manages thresholds used for determining the MIMO Ranks of the MS's. The reference numeral 215 denotes a block that resides in the scheduler 212, and manages the number of active MS's among MS's connected to the APs. The reference numeral 216 denotes a block that resides in the scheduler 212 and manages thresholds used for judging whether for the MU-MIMO to be applied to each MS.

Figure 4:
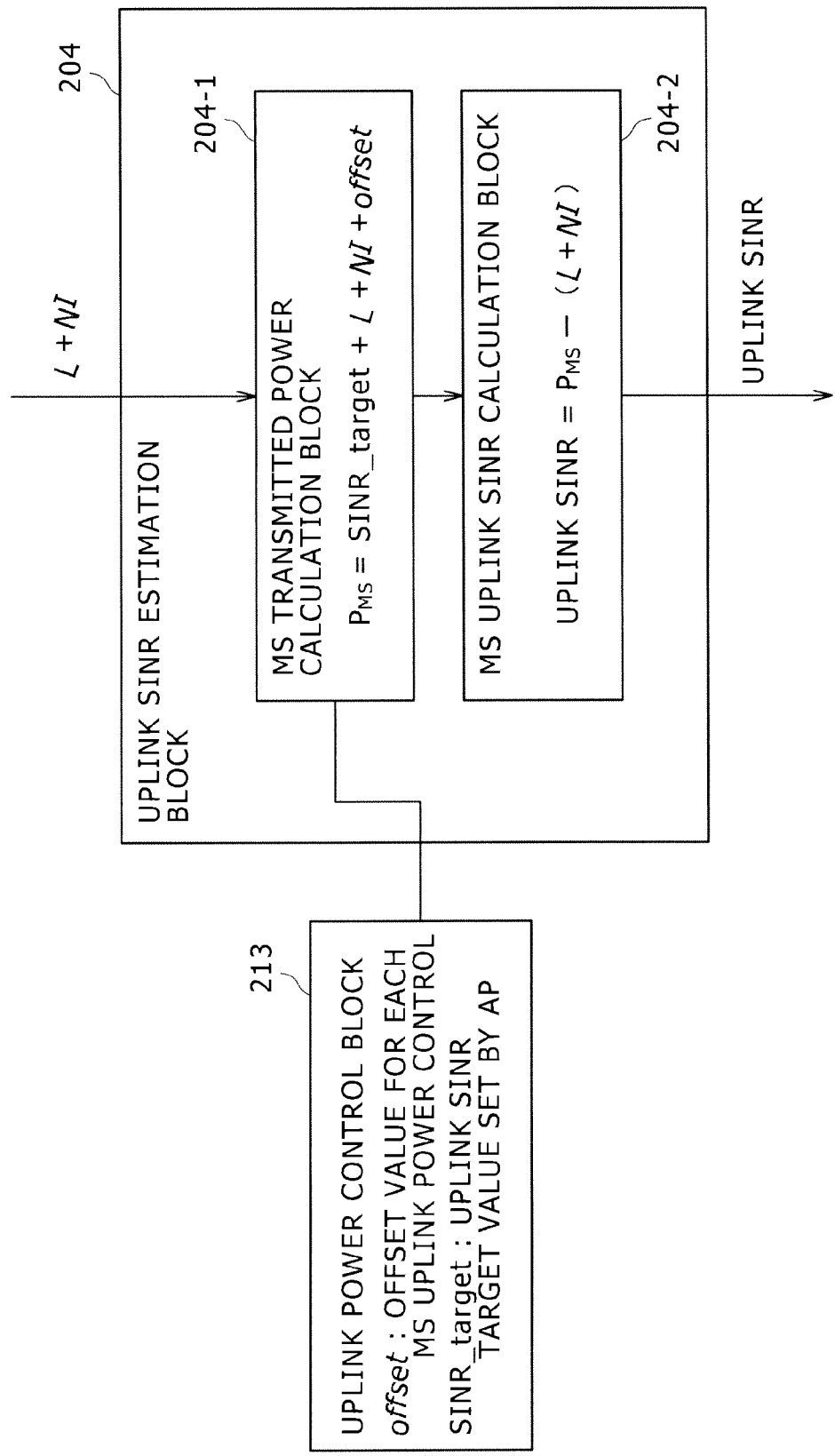
FIG. 4 is a diagram showing an example of the behavior of the AP to which the present invention is applied in the case where the AP estimates the uplink SINRs.

FIG. 4 is a diagram showing the processing contents of Uplink SINR Estimation block 204 in the scheduler 212. The reference numeral 204-1 denotes a block that calculates an MS uplink transmission power $P_{MS}$ for each MS with the use of a propagation path loss (L+NI) provided by each MS, an offset value for each MS uplink power control (offset) given by Uplink Power Control block 213, and an uplink SINR target value (SINR_target). The uplink SINR target value is a preset value set by the AP, and is determined in advance for each system design. The reference numeral 204-2 denotes a block that calculates an uplink SINR for each MS with the use of the $P_{MS}$ calculated by the block 204-1 and the propagation path loss (L+NI).

Figure 5:
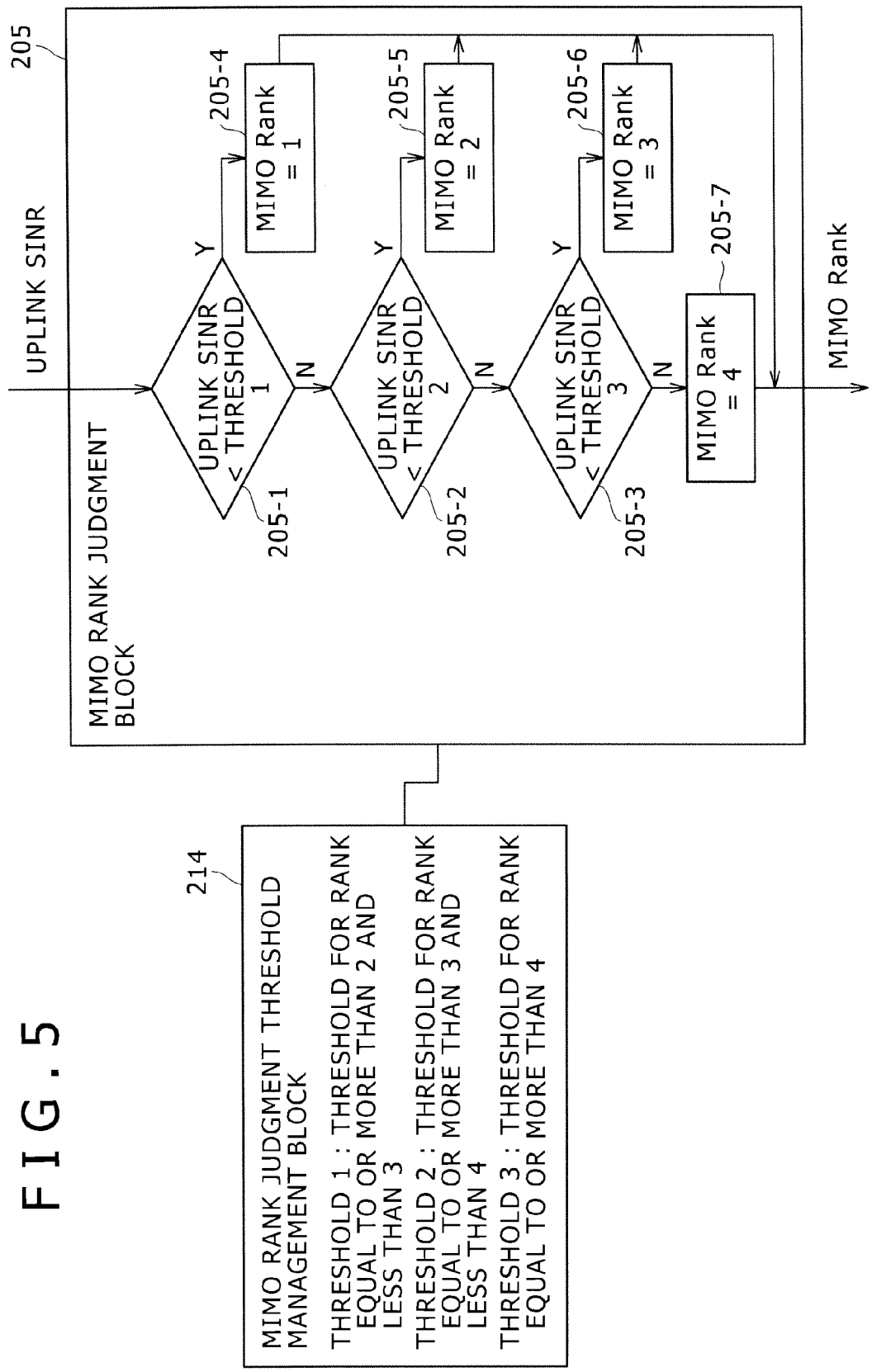
FIG. 5 is a diagram showing an example of the behavior of the AP to which the present invention is applied in the case where the AP judges the MIMO Rank of an MS.

FIG. 5 is a diagram showing the processing contents of MIMO Rank Judgment block 205 shown in FIG. 3. Step 205-1 is a step at which it is judged whether the MIMO Rank of an MS is equal to or more than 2 or not, and it is judged whether the uplink SINR of the MS is lower than the threshold 1 at step 205-1, and if the uplink SINR is lower than the threshold 1, the MIMO Rank of the MS is set to be 1 at block 205-4. Step 205-2 is a step at which it is judged whether the MIMO Rank of the MS is equal to or more than 3 or not, and it is judged whether the uplink SINR of the MS is lower than the threshold 2 at the step 205-2, and if the uplink SINR is lower than the threshold 2, the MIMO Rank of the MS is set to be 2 at block 205-5. Step 205-3 is a step at which it is judged whether the MIMO Rank of The MS is equal to or more than 4 or not, and it is judged whether the uplink SINR of the MS is lower than the threshold 3 at the step 205-3, and if the uplink SINR is lower than the threshold 3, the MIMO Rank of the MS is set to be 3 at block 205-6. If the uplink SINR of the MS is equal to or higher than the threshold 3, the MIMO Rank of the MS is set to be 4 at block 205-7. The threshold values used for the above threshold judgments are managed by MIMO Rank Judgment Threshold Management block 214. In MIMO Rank Judgment Threshold Management block, the default values set in advance by a system operator for each system design are registered as the thresholds.

Figure 6:
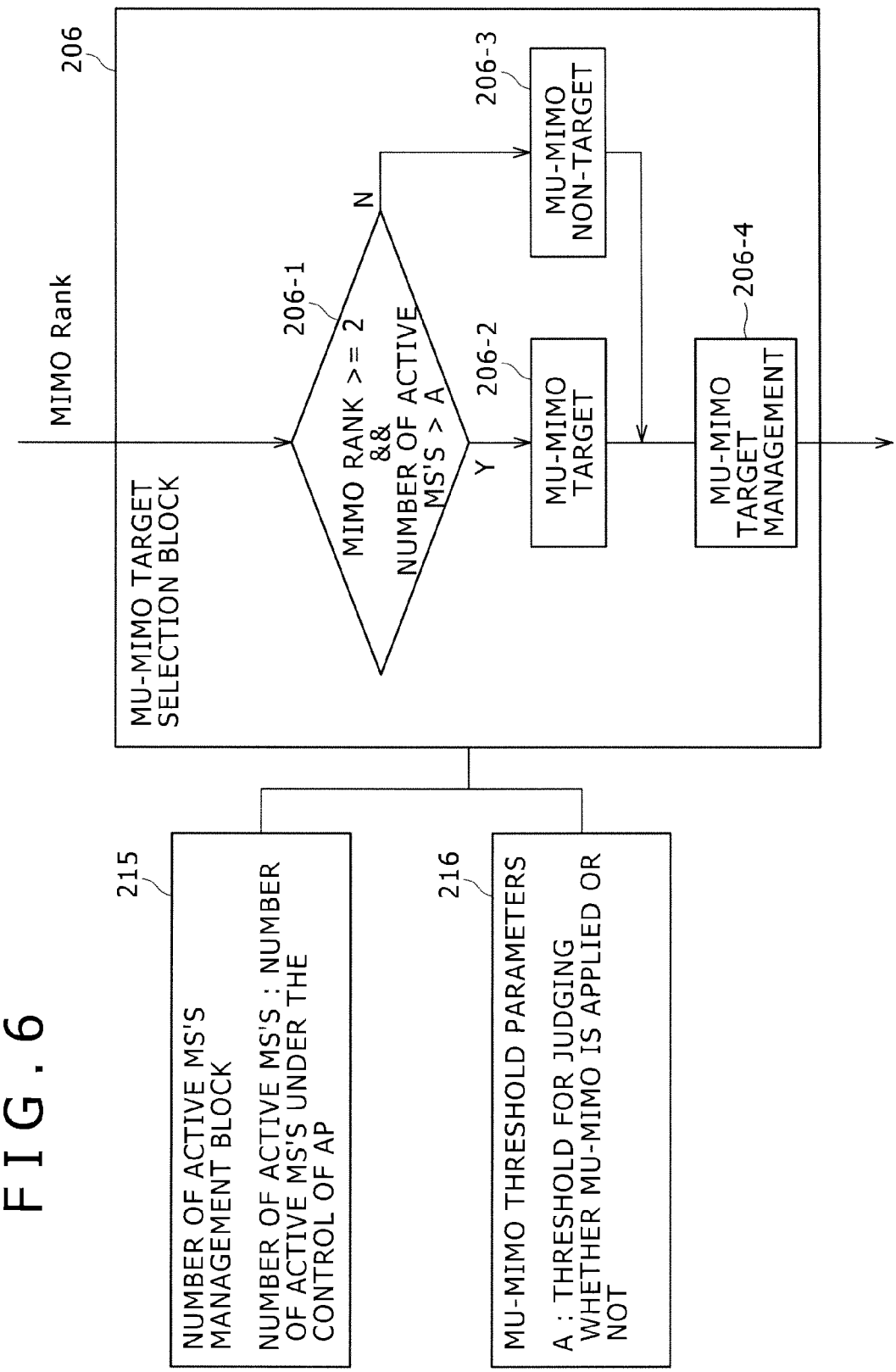
FIG. 6 is a diagram showing an example of the behavior of the AP to which the present invention is applied in the case where the AP selects an MS as an MU-MIMO target.

FIG. 6 is a diagram showing the processing contents of MU-MIMO Target Selection block 206 shown in FIG. 3. Step 206-1 is a step at which it is judged whether an MS is an MU-MIMO target or not with the use of the MIMO Rank of the MS and the number of MS's that are currently communicating with the AP (Number of Active MS's) among the MS's connected to the AP. In accordance with the judgment, the MS is classified into an MU-MIMO target group 206-2 or an MU-MIMO nontarget group 206-3, and these groups are managed by MU-MIMO Target Management block 206-4. A threshold A and the number of active MS's used for the above judgment at step 206-1 are managed by Number of Active MS's Management block 215 and MU-MIMO Threshold Parameters block 216.

FIG. 7 shows information managed by MU-MIMO Target Management block 206-4 shown in FIG. 6. The reference numeral 206-4-1 denotes identification codes of the MS's (MS ID's). The reference numeral 206-4-2 denotes the results of MU-MIMO target judgments of the MS's. The reference numeral 206-4-3 denotes the values of the uplink SINRs of the MS's.

Figure 8:
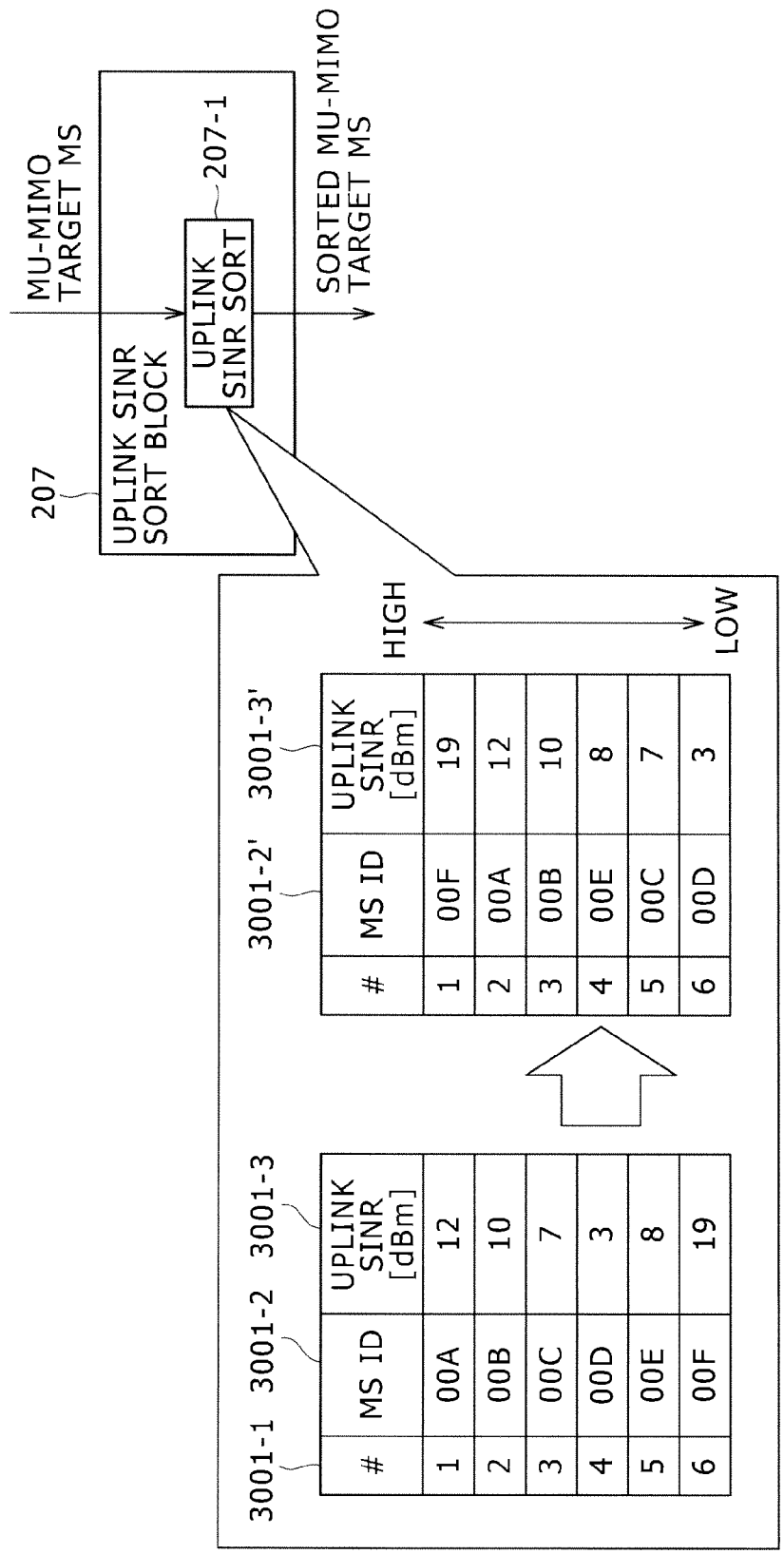
FIG. 8 is a diagram showing an example of the behavior of the AP to which the present invention is applied in the case where the AP sorts MS IDs in descending order of the uplink SINRs of the MU-MIMO target MS's.

FIG. 8 shows the processing contents of Uplink SINR Sort block 207 shown in FIG. 3. The numbers in the column # denoted by the reference numeral 3001-1 are numbers given to the MU-MIMO target MS's managed by MU-MIMO Target Management block 206-4. The characters in the column MS ID denoted by the reference numeral 3001-2 are examples of the managed IDs of the MS's. The reference numeral 3001-3 denotes the column Uplink SINR that shows the values of the uplink SINRs of the MS's. In Uplink SINR block denoted by the reference numeral 207-1, the MS IDs are sorted in descending order of the values of the uplink SINRs 3001-3 corresponding to the MS IDs (Refer to the columns denoted by 3001-2' and 3001-3').

Figure 9:
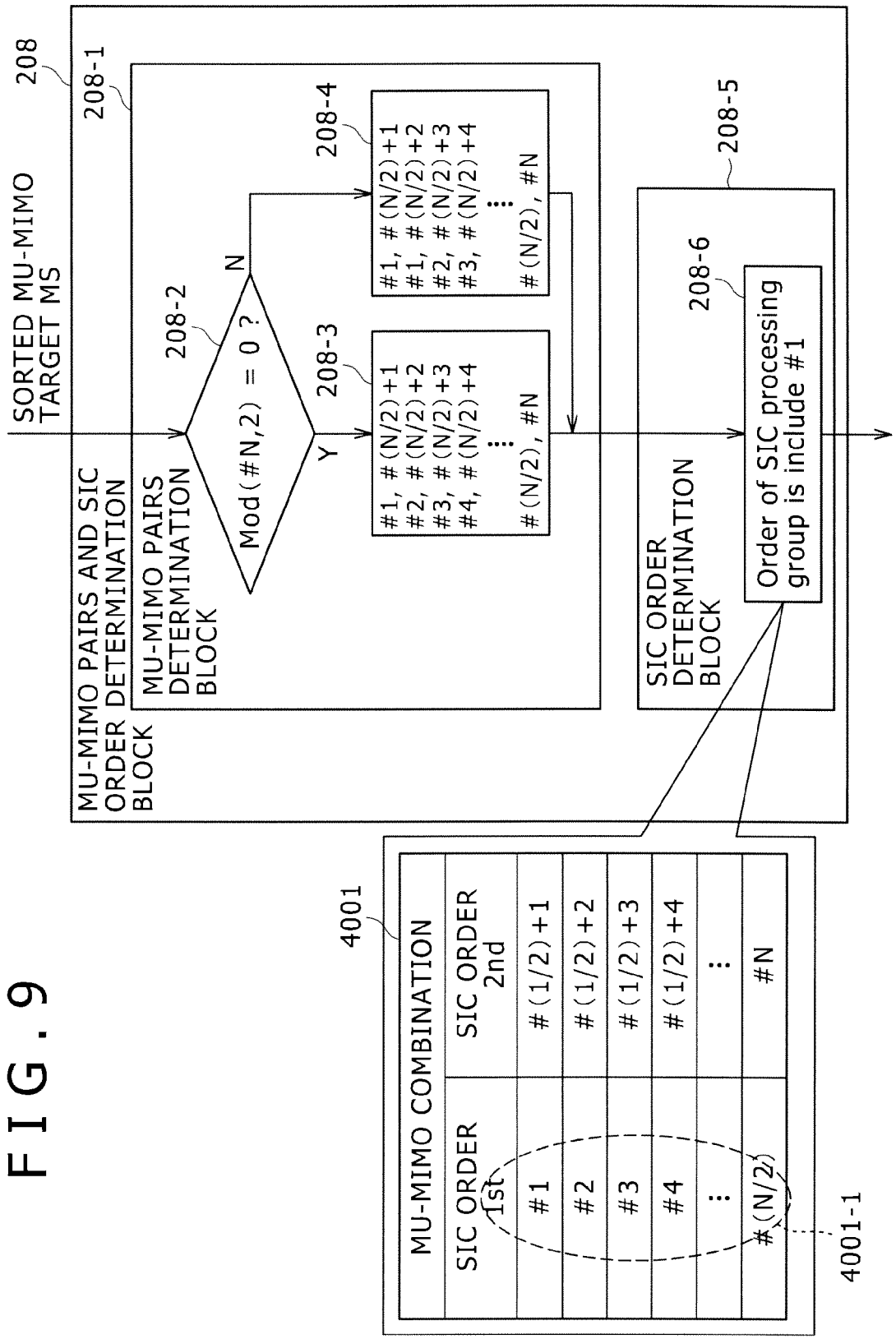
FIG. 9 is a diagram showing an example of the behavior of the AP to which the present invention is applied in the case where the AP determines MU-MIMO pairs and the order of SIC signal processing.

FIG. 9 shows the processing contents of Signal Processing Order Determination block 208, in which the SIC, one of interference reduction technologies, is used. Signal Processing Order Determination block 208 determines MU-MIMO pairs, that is, combinations of multiplexed users whose MS's is used in communication with the AP. The reference numeral 208-1 denotes MU-MIMO Pair Determination block that shows how to determine the MU-MIMO pairs. Step 208-2, blocks 208-3 and 208-4 determine the MU-MIMO pairs in such a way that, after the MS's are sorted in descending order of their SINRs, the user #1 with the highest SINR and the user #(N/2+1) make an MU-MIMO pair, and the user #2 with the second-highest SINR and the user #(N/2+2) make another MU-MIMO pair, and so on by dividing the MS's into two groups by setting the boundary line between the user #(N/2) and the user #(N/2+1). Step 208-2 judges whether the number of the MU-MIMO target MS's is even or odd. If the number of the MU-MIMO target MS's is odd, the MS #1 with the highest SINR and the MS #(N/2+1) make an MU-MIMO pair, and further the MS #1 with the highest SINR and the MS #(N/2+2) make another MU-MIMO pair. The reference numeral 208-5 denotes SIC Order Determination block in which a group decoded first by the SIC is determined. SIC Order Determination block 208-5 manages MU-MIMO Combination table such a table as shown by the reference numeral 4001, and SIC signal processing is performed on a group 4001-1 including the user #1 with the highest SINR first in accordance with the order determination processing performed by the block 208-6.

Figure 10:
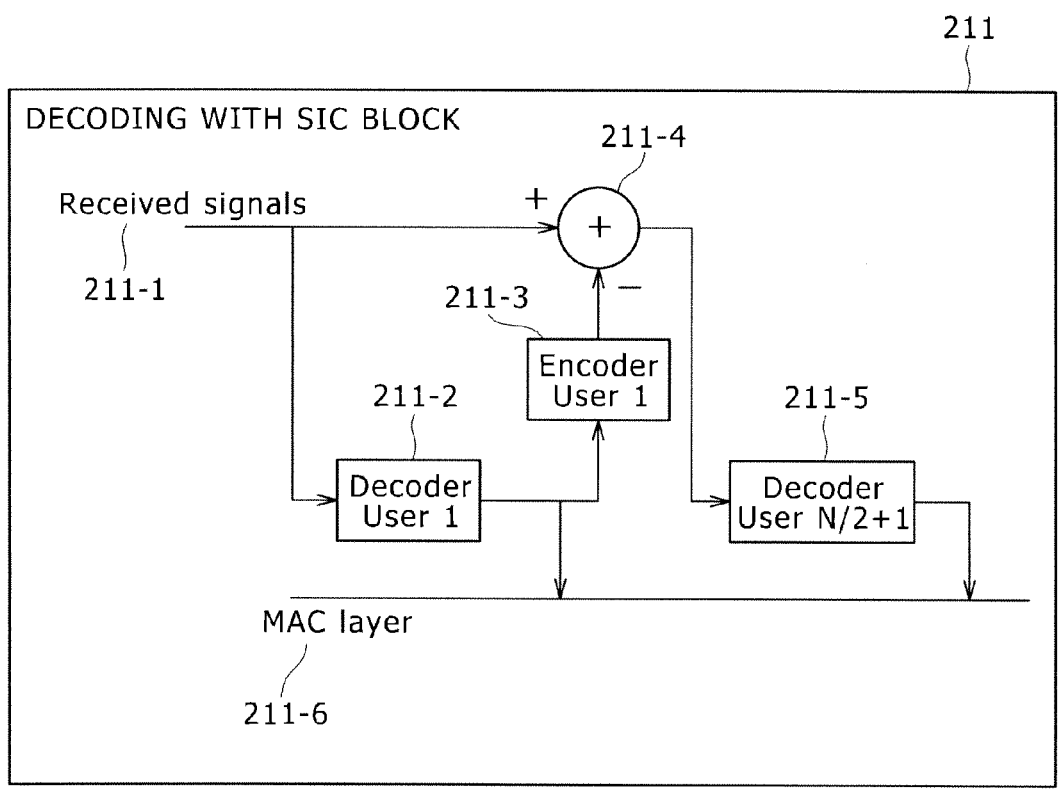
FIG. 10 is a diagram showing an example of the behavior of the AP to which the present invention is applied in the case where the AP decodes signals received from the MS's with the use of the SIC.

FIG. 10 shows an example of the processing contents of Decoding with SIC block 211. The reference numeral 211-1 denotes received signals, that is, data signals 210 that are sent from the MS's and received by the AP. The reference numeral 211-2 denotes a block that decodes the received signals 211-1 in accordance with the schedule determined by the block 208. Although FIG. 10 shows MU-MIMO pairs and SIC Order Determination block in which the signals of the user #1 with the highest SINR (User 1) and the user #(N/2+1) with the (N/2+1)th SINR (User N/2+1) are decoded as an example, this is only example for explaining one of behaviors of the embodiment of the present invention. In this block, the signals are decoded in accordance with the contents of the schedule. The reference numeral 211-3 is a block in which the signals decoded in the block 211-2 is encoded. The reference numeral 211-4 denotes an arithmetic unit that subtracts the signal generated at the block 211-3 from the received signals 211-1. The reference numeral 211-5 denotes the signal of User N/2+1 generated by subtracting the signal generated at the block 211-3 from the received signals 211-1. The reference numeral 211-6 denotes MAC layer inside the AP, which is informed of the signals obtained by decoding at the blocks 211-2 and 211-5. In the SIC, a signal mixedly received with another signal is decoded, the replica signal of the decoded signal is created, and the replica signal is eliminated from all the received signals, which leads to the improvement of error characteristics of signals decoded later. However, if the decoded signal is an erroneous signal, the signal generated at the block 211-3 also becomes an erroneous signal, and thereby the signal of User 1 that is an interference signal to the signal of User N/2+1 cannot be properly eliminated, and the effect of the SIC cannot be utilized sufficiently.

In the present embodiment, the uplink SINRs of the MS's are estimated on the basis of the propagation losses sent from the MS's, and the combinations of the MU-MIMO users are determined on the basis of the estimated SINRs. The first embodiment of the present invention will be described with reference to FIG. 3. It will be assumed that the MS's 202-1 to 202-N under the control of the AP 201 are communicating with the AP. The MS's 202-1 to 202-N respectively inform the AP of the information about the propagation losses (L+NI) 203, and the AP estimates the uplink SINRs for respective MS's at SINR Estimation block 204. Uplink Power Control block 213 provides the information necessary for estimating the uplink SINRs. The MIMO Ranks of the MS's are estimated on the basis of the estimated SINRs. MIMO Rank Judgment Threshold Management block 214 manages the threshold information used for judging the MIMO Ranks of the MS's. MU-MIMO Rank Target Selection block 206 selects MS's to be MU-MIMO target MS's on the basis of the MIMO Ranks judged at the block 205. Number of Active MS's Management block 215 and MU-MIMO Threshold Parameters block 216 provide the information necessary for selecting the MU-MIMO target MS's. Uplink SINR Sort block 207 sorts the MU-MIMO target MS's selected at the block 206 in descending order of the uplink SINRs of the MU-MIMO target MS's. MU-MIMO Pairs and SIC Order Determination block 208 determines MU-MIMO pairs and the order of SIC processing performed on the MS's on the basis of the order determined by sorting at the block 207. The AP informs the MU-MIMO target MS's of the determined schedule information through the notification of the schedule information 209. The MU-MIMO target MS's send the uplink data signals 210 in accordance with the schedule information (information about time-frequency areas) provided by the AP. The Decoding with SIC block 211 of the AP decodes the multiplexed MU-MIMO uplink signals sent from the MS's in accordance with the SIC decoding order determined by the block 208.

A method for estimating the uplink SINRs of the MS's according to the present embodiment is not limited to the method that has been described in the above-described embodiment, that is, the method in which the AP estimates the uplink SINRs for respective MS's on the basis of the propagation losses provided by the MS's. For example, it is conceivable that the AP adopts the values that a receiving unit of the AP estimates on the basis of the uplink signals of the MS's as the uplink SINRs of the MS's. In addition, a method for judging the MIMO Ranks of the MS's according to the present embodiment is not limited to the method described in the above-described embodiment in which the AP estimates the MIMO Ranks of respective MS's. For example, it is conceivable that the AP adopts the downlink MIMO Ranks provided by the MS's as the MIMO Ranks of the MS's. In addition, when a combination of the MU-MIMO users is determined, the number of MS's, the signals from which are multiplexed, according to the present embodiment is not limited to two, and the present invention can be applied to the case where the number of MS's is three or more.

Second Embodiment

Figure 11:
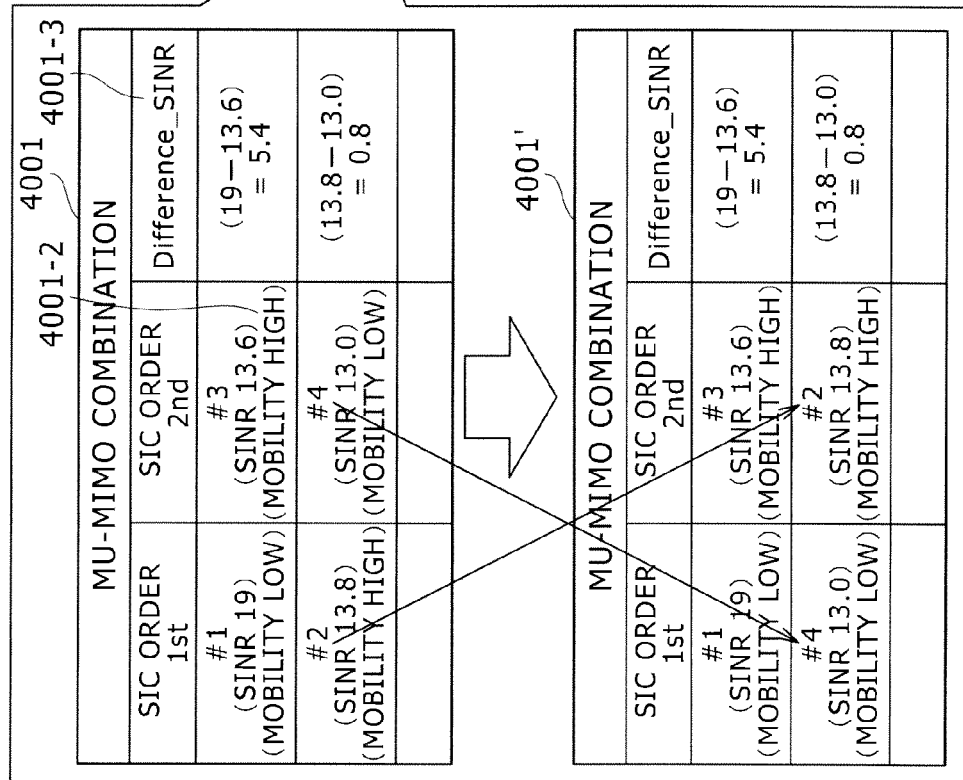
FIG. 11 is a diagram showing an example of the behavior of the AP to which the present invention is applied in the case where the AP determines the order of the SIC signal processing with the use of mobility information about the MS's along with the uplink SINRs of the MS's.

The present embodiment is characterized in that, when determining an MU-MIMO pair of MS's, even if the communication qualities of both MS's are almost equal to each other, the effect of the SIC can be made greater by taking the mobilities of both MS's into consideration (for example, by taking the mobility of one MS is higher than that of the other MS or vice versa into consideration). If the communication qualities of both MS's that make an MU-MIMO pair are almost equal to each other, the effect of the SIC can be made greater by taking the mobilities of both MS's into consideration and processing first one of the pair of the MS's that is less likely to be influenced by the Doppler effect. A second embodiment of the present invention will be described with reference to FIG. 9 and FIG. 11. This embodiment includes processes in which the order of SIC processing about each pair of MS's is reconsidered with the use of mobility information about both MS's after the MU-MIMO pairs are determined using the uplink SINRs as measures of the communication qualities of the MS's at MU-MIMO Pairs Determination block 208-1 in FIG. 9, and after the order of SIC processing about each pair of the MS's is determined at the block 208-6 in FIG. 11. For example, SIC Order Determination block 208-5 manages information about a difference 4001-3 between the SINRs of two MS's that constitute each pair, and mobility information about both MS's of each pair 4001-2 as shown in the table 4001. After the order of SIC processing is determined at the block 208-6, a judgment circuit 208-7-1 compares the difference between the uplink SINRs of two MS's which constitute each MU-MIMO pair with a threshold Delta 208-7-2 that can arbitrarily be determined by the AP. Here, the difference between the uplink SINRs of two MS's which constitute each MU-MIMO pair is shown in the column Difference$_{\_SINR}$ 4001-3. If the difference is smaller than the threshold Delta, a judging circuit 208-7-4 that compares the mobilities of the two MU-MIMO target MS's which constitute each MU-MIMO pair at Mobility Consideration block 208-7-3 compares the mobilities of the two MS's. If the mobility of one MS of each pair on which SIC processing is to be performed first is higher that that of the other MS on which SIC processing is to be performed next, the orders of SIC processing of the two MU-MIMO target MS's are exchanged at the block 208-7-5 as shown in a table 4001'. In the present embodiment, a method for determining the MU-MIMO pairs is not limited to the method that determines the MU-MIMO pairs with the use of the uplink SINRs of the MS's and, for example, a method that determines the MU-MIMO pairs with the use of the channel quality indexes (CQI's) provided by the MS's or the transmission powers of the MS's may be one of powerful methods.

Third Embodiment

The present embodiment is characterized in that, after the MU-MIMO pairs are determined, even if the communication qualities of two MS's that constitute the MU-MIMO pair are almost equal to each other, the error rate of one of the two MS's can be lowered by lowering the MCS index (modulation and coding index) of the one of the MS's, which makes the effect of the SIC more sufficiently utilizable. This embodiment of the present invention will be described with reference to FIGS. 3 and 9. Through the uplink SINR sort at the block 207 and the MU-MIMO pair determination at the block 208 in FIG. 3, it is assumed that the MU-MIMO pairs are determined with the use of the uplink SINRs of the MS's as the indicators of communication qualities of the MS's. In this case, if the communication qualities of two MS's that constitute an MU-MIMO pair indicated by 4001 in FIG. 9 are almost equal to each other, the coding rate of one of the two MS's can be raised by lowering the MCS index of the one of the MS's in group 4001-1 belonging to SIC order 1st, which makes the reception success rate of the one of the MS's high. In this case, it becomes possible that the effect of the SIC is utilized more sufficiently by decoding the one of the MS's first.

Fourth Embodiment

The present embodiment is characterized in that, after the MU-MIMO pairs are determined, if the multiplexed data of two MS's that constitute an MU-MIMO pair is requested to be retransmitted in response to a HARQ (hybrid automatic repeat request) in regard to one of the two MS's, it becomes possible that the effect of the SIC is utilized more sufficiently by decoding first the one of the MS's that is a target of the HARQ. This embodiment of the present invention will be described with reference to FIGS. 3 and 9. Through the uplink SINR sort at the block 207 and the MU-MIMO pair determination at the block 208, it is assumed that the MU-MIMO pairs are determined with the use of the uplink SINRs of the MS's as the indicators of communication qualities of the MS's. In this case, if the multiplexed data of two MS's that constitute an MU-MIMO pair indicated by 4001 in FIG. 9 is requested to be retransmitted in response to the HARQ in regard to one of the two MS's, there is a high possibility that the signal sent by the one of the two MS's is correctly decoded because the signal has more accumulated redundant bits. Therefore, it becomes possible that the effect of the SIC is utilized more sufficiently by decoding the signal sent by the one of the two MS's first. In the present embodiment, a method for determining the MU-MIMO pairs is not limited to the method that determines the MU-MIMO pairs with the use of the uplink SINRs of the MS's and, for example, a method that determines the MU-MIMO pairs with the use of the channel quality indexes (CQI's) provided by the MS's or the transmission powers of the MS's may be one of powerful methods.

What is claimed is:

1. An AP (access point: wireless base station), comprising:
   a plurality of antennas;
   a scheduler used for performing uplink MU-MIMO communication with a plurality of terminals at the same time and at the same frequency; and
   a MIMO decoder configured to utilize SIC (Successive Interference Cancellation),
   wherein the scheduler is configured to determine combinations of the terminal users on a basis of uplink communication quality information of the plurality of the terminals when MU-MIMO communication is performed, and to send the determined combinations of the users as schedule information,
   wherein an order of decoding the combinations of the users is determined on the basis of the receiving qualities of the terminals and accumulated redundant bit information about the terminals.

2. The AP according to claim 1, wherein the combinations of the users are determined in an order of the users having terminals with higher receiving qualities.

3. The AP according to claim 1, wherein the scheduler is configured to decode received signals, which is sent from the terminals in accordance with the schedule information sent from the scheduler, in an order of the combinations of the users.

4. The AP according to claim 1, wherein an order of decoding the combinations of the users is determined on the basis of the receiving qualities of the terminals and mobility information about the terminals.

5. The AP according to claim 1, wherein, when there is a plurality of terminals having the same degree of receiving qualities at the time of determining the combinations of the users, an modulation level of any of the terminals is decreased.

6. An AP (access point: wireless base station), comprising:
   a plurality of antennas;
   a scheduler used for performing uplink MU-MIMO communication with a plurality of terminals at the same time and at the same frequency; and
   a MIMO decoder configured to utilize SIC (Successive Interference Cancellation),
   wherein the scheduler is configured to determine combinations of the terminal users on a basis of uplink communication quality information of the plurality of the terminals when MU-MIMO communication is performed, and to send the determined combinations of the users as schedule information,
   wherein the scheduler is configured to sort the terminals in descending order of the uplink communication quality and to determine the combinations of the terminal users and an order of SIC processing on the basis of the sorted order; and
   wherein the MIMO decoder is configured to decode multiplexed MU-MEMO uplink signals sent from the terminals in accordance with the order of SIC processing.

* * * * *